United States Patent [19]

Esterowitz et al.

[11] Patent Number: 4,969,150
[45] Date of Patent: Nov. 6, 1990

[54] TUNABLE, CONTINUOUS WAVE, THULIUM-DOPED, SOLID STATE LASER

[75] Inventors: Leon Esterowitz, Springfield; Robert C. Stoneman, Alexandria, both of Va.

[73] Assignee: The United States of America as represented by the Secretary of the Navy, Washington, D.C.

[21] Appl. No.: 510,499

[22] Filed: Mar. 30, 1990

[51] Int. Cl.$^5$ ............................................. H01S 3/10
[52] U.S. Cl. ..................................... 372/20; 372/105; 372/41
[58] Field of Search ..................... 372/6, 75, 39, 41, 20

[56] References Cited

U.S. PATENT DOCUMENTS 4,782,491  11/1988  Snitzer ..................................... 372/6
4,847,850  7/1989  Kafka et al. ............................. 372/6

*Primary Examiner*—Léon Scott, Jr.
*Attorney, Agent, or Firm*—Thomas E. McDonnell; George Jameson

[57] ABSTRACT

A room-temperature, solid state laser for producing a CW laser emission continuously tunable over the approximate spectral range of 1.86 to 2.14 microns is disclosed. In a preferred embodiment, the laser comprises: a diode pump laser for producing a CW pump beam at a preselected wavelength; a laser cavity defined by first and second reflective elements opposing each other on a common axis to form a reflective path therebetween; a laser crystal disposed in the laser cavity, the laser crystal having a host material doped with a concentration of thulium activator ions sufficient to produce a CW laser emission in the range of a plurality of wavelengths determined by the Stark components in the $^3F_4$ to $^3H_6$ laser transition in the thulium activator ions when the laser crystal is pumped by the CW pump beam; and means disposed in the laser cavity between the laser crystal and the second reflective element for tuning the CW laser emission to any of the plurality of wavelengths within the range between approximately 1.86 microns and approximately 2.14 microns.

23 Claims, 3 Drawing Sheets

TUNABLE, CONTINUOUS WAVE, THULIUM-DOPED, SOLID STATE LASER

CROSS-REFERENCE TO RELATED APPLICATION

This patent application is related to the co-pending United States patent application entitled "A Room-Temperature, Laser Diode-Pumped, Q-Switched, 2 Micron, Thulium-Doped, Solid State Laser", Ser. No. (Navy Case No. 72,611), filed Mar. 30, 1990, both of which applications having the same inventive entity and being commonly assigned to the Government of the United States.

BACKGROUND OF THE INVENTION

1. Field of the Invention

The present invention relates to lasers and particularly to a laser-pumped, thulium-doped, solid state laser for producing a CW laser emission which is tunable over the range of wavelengths from about 1.86 microns to about 2.14 microns at or near room temperature.

2. Description of the Prior Art

The near infrared spectral region contains strong absorption bands for several important molecules. For example, the region near 2 microns contains the $v_2+v_3$ (centered at 1.88 microns) water absorption band and the $2v_1+v_3$ (centered at 1.96 microns), the $v_1+2v_2+v_3$ (centered at 2.01 microns), and the $4v_2+v_3$ (centered at 2.06 microns) carbon dioxide absorption bands. Therefore, tunable lasers in at least this 1.88 to 2.06 micron region are of interest for remote sensing applications (such as coherent laser radar) and for sensitive absorption techniques (such as frequency modulation spectroscopy). Such tunable lasers are also of interest in medical applications due to the strong absorption of liquid water near 1.93 microns. These tunable lasers can also be utilized in the field of high resolution spectroscopy of molecules and solid state materials.

Previous researchers have pumped the $^3F_4$ to $^3H_6$ transition of $Tm^{3+}$:YAG to obtain laser emissions in the area of 2 micron wavelengths. Some previous researchers have obtained pulsed emissions at 1.88 microns and at 2.01 microns at a temperature of 77° K., pulsed emission at 2.02 microns at room temperature, and CW emission at a wavelength of 2.01 microns at 77° K. Other researchers have achieved room-temperature, CW laser emission at 1.86 microns with krypton laser pumping in $Tm^{3+}$:YSGG.

Therefore, there is a need for a laser system to provide a room-temperature, CW laser emission that is continuously tunable over the spectral range of 1.86 to 2.14 microns for use in any of the above-identified variety of different applications.

OBJECTS OF THE INVENTION

Accordingly, one object of the invention is to produce a room-temperature, CW laser emission continuously tunable over the spectral range of 1.86 to 2.14 microns.

Another object of the invention is to provide a compact, economical, laser-pumped, solid state laser for producing a CW laser emission tunable over the spectral range of substantially 1.86 to 2.14 microns.

Another object of the invention is to provide a room-temperature, laser-pumped, thulium-doped, solid state laser for producing a CW laser emission tunable over the spectral range of 1.86 to 2.14 microns and method for operating same.

Another object of the invention is to provide a room-temperature, laser diode-pumped, thulium-doped, solid state laser for producing a CW laser emission tunable over the spectral range of 1.86 to 2.14 microns.

Another object of the invention is to provide a room-temperature, titanium-sapphire laser-pumped, thulium-doped, solid state laser for producing a CW laser emission tunable over the spectral range of 1.86 to 2.14 microns.

A further object of the invention is to provide a laser-pumped solid state laser having a host crystal material selected from the group consisting of YAG, YSAG, YSGG, YGG, GGG, GSAG, GSGG, LLGG, YAlO, YLF and mixtures thereof and with the host material being doped with a concentration of $Tm^{3+}$ activator ions sufficient to produce a CW laser emission that is tunable over the spectral range from approximately 1.86 microns to approximately 2.14 microns.

SUMMARY OF THE INVENTION

These and other objects of the invention are achieved by providing a room-temperature, solid state laser for producing a CW laser emission continuously tunable over the spectral range of 1.86 to 2.14 microns. The room-temperature solid state laser includes a laser pump for emitting a CW pump beam at a preselected wavelength and a laser crystal disposed in a laser cavity defined by first and second reflective elements opposing each other on a common axis to form a reflective path therebetween. The laser crystal has a host material doped with an amount of thulium activator ions sufficient to produce a laser emission having a spectrum of fluorescence which produces a plurality of wavelengths within the range of 1.86 to 2.14 microns. A tuning means is disposed in the laser cavity between the laser crystal and the second reflective element for tuning the CW laser emission to any of the plurality of wavelengths within the range of 1.86 to 2.14 microns.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
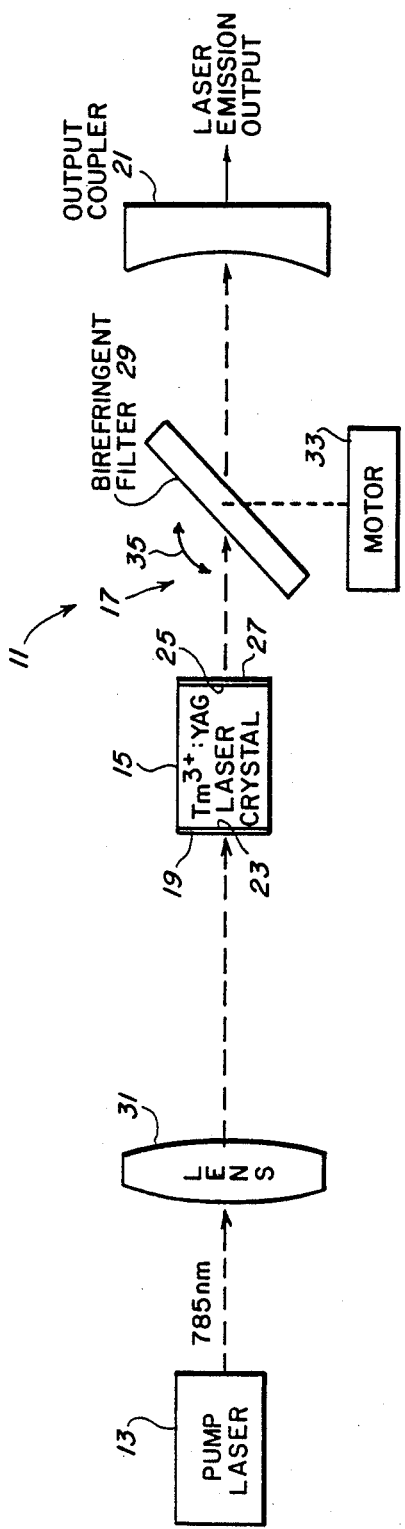
FIG. 1 illustrates a preferred embodiment of the invention.

Referring now to the drawings, FIG. 1 illustrates a preferred embodiment of the invention in which a room-temperature, thulium-doped ($Tm^{3+}$-doped), solid state laser 11 is pumped by a 785 nanometer (nm), continuous wave (CW) laser beam from a pump laser 13 to produce a CW laser emission which is tunable over the spectral range of 1.86 to 2.14 microns.

Pump laser 13, which emits the CW 785 nm laser beam to pump the laser 11, is preferably a GaAlAs laser diode array or a GaAlAs laser diode. However, the pump laser 13 can also be a titanium:sapphire laser which also can produce a CW pump beam at a wavelength of 785 nm. It should be noted at this time that the pump wavelength of 785 nm was chosen because 785 nm is the absorption peak of the thulium in the solid state laser 11.

The solid state laser 11 is comprised of a laser rod or crystal 15 disposed in a laser cavity 17 defined by optically aligned, input and output reflective elements or mirrors 19 and 21. Reflective elements 19 and 21 oppose each other on a common axis to form a reflective path therebetween.

The laser crystal 15, which can have a length between 0.25 mm and 25 mm (millimeters), has an exemplary length in this description of approximately 3 millimeters (mm) and also has flat and parallel surfaces 23 and 25. The input surface 23 of the laser crystal 15 has a dichroic coating which operates as the input reflective element or mirror 19. However, it should be understood that the mirror 19 could be a separate mirror spaced apart from the laser crystal 15. The dichroic coating or mirror 19 has a high transmission (about 76%) at the pump wavelength of 785 nm and a high reflection (about 99%) at a wavelength of about 2 microns. The second surface 25 of the laser crystal 15 has an anti-reflection coating 27 at about 2 microns.

The output reflective element or mirror 21, which defines the output end of the laser cavity 17, is concave and has an exemplary 10 centimeter (cm) radius of curvature. This output mirror 21 is also highly reflective at about 2 microns. However, mirror 21 is approximately 0.5% transmissive at output wavelengths within the range of 1.86 to 2.14 microns. Consequently, mirror 21 operates as an output coupler to output a portion of the laser emission developed by the laser crystal 15 when it is pumped by the 785 nm CW laser emission from the pump laser 13.

A birefringent tuning element or birefringent filter 29, which can be an exemplary birefringent quartz plate or birefringent filter plate, is inserted in the cavity 17, at Brewster's angle, between the laser crystal 15 and the output mirror 21. The coatings 19 and 27 of the laser crystal 15 have sufficient bandwidths (greater than 0.2 microns) to allow tuning over the desired wavelength range of 1.86 to 2.14 microns. The 785 nm pump beam from the pump laser 13 is focused into the laser cavity 17 mode by a lens 31 having a 10 cm focal length. The birefringent filter 29 is oriented such that the linear polarization of the $Tm^{3+}$-doped laser crystal 15 is the same as that of the pump laser 13.

Continuous tuning of the solid state laser 11 over the desired wavelength range of 1.86 to 2.14 microns can be achieved by using a motor 33, which is operationally coupled to the birefringent filter 29, to slowly rotate the birefringent filter 29 about its axis in either of the directions indicated by the arc 35.

Figure 2:
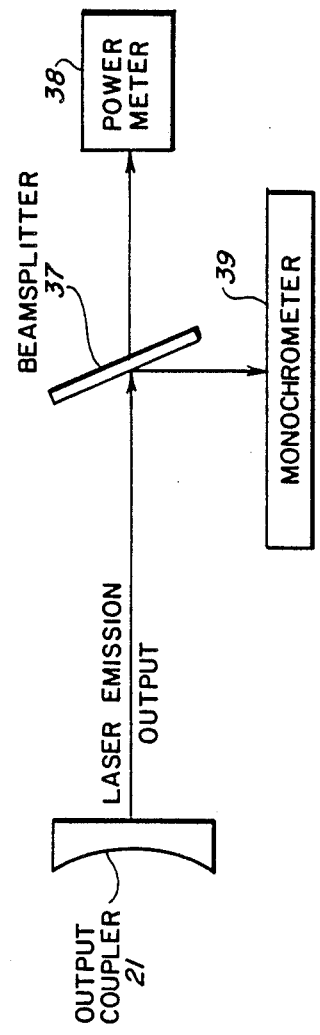
FIG. 2 illustrates a modification of the embodiment of FIG. 1 to monitor the output laser emission.

As shown in FIG. 2, the output power and wavelength of the output emission from the solid state laser 11 can be monitored as the birefringent filter plate 29 is being rotated about its axis by the motor 33. To monitor the output of the $Tm^{3+}$-doped, solid state laser 11, a first portion of the laser emission output from the output mirror 21 is passed through a beamsplitter 37 into a power meter 38 to monitor the output laser power, while a second portion of the laser emission output is reflected from the beamsplitter 37 into a monochromator 39 for simultaneously monitoring the wavelength of the laser 11, as the birefringent filter 29 of laser 11 is being tuned through the wavelength range of 1.86 to 2.14 microns.

The laser crystal or rod 15 has a laser host crystal material (not shown) which is selected from the broad group consisting of YAG (yttrium aluminum garnet), YSAG (yttrium scandium aluminum garnet), YSGG (yttrium scandium gallium garnet), YGG (yttrium gallium garnet), GGG (gadolinium gallium garnet), GSAG (gadolinium scandium aluminum garnet), GSGG (gadolinium scandium gallium garnet), LLGG (lanthanum lutetium gallium garnet), YAlO (yttrium aluminum oxygen) and YLF (yttrium lanthanum fluoride). The host crystal material could also be comprised of mixtures or combinations of this broad group of crystal materials. The preferred group of host crystal materials is comprised of YAG, YSAG, YSGG, GSAG, GSGG and mixtures thereof; and the most preferred group of host crystal materials is comprised of YAG, YSGG and mixtures thereof.

The selected host crystal material of the laser crystal or rod 15 is doped with an effective amount of $Tm^{3+}$ (thulium) activator ions. When the laser rod 13 is pumped by the CW laser beam from the pump laser 13, the laser crystal 15 develops an output CW laser emission (to be explained).

The chief characteristic or requirement of a selected host crystal material is that it must have the capability of easily accepting the dopant trivalent thulium ions ($Tm^{3+}$). The dopant $Tm^{3+}$ ions must go into the host crystal material without significantly distorting the lattice of the host crystal material so that the quality of the host crystal material remains high.

The $Tm^{3+}$ ions are the activator ions which cause the lasing from the laser crystal 15. The $Tm^{3+}$ concentration must be high enough so that an efficient cross-relaxation process (to be explained), which populates the upper laser level, takes place. The term "effective amount of $Tm^{3+}$ ions" means that the concentration of $Tm^{3+}$ ions in the host crystal material is sufficient to enable a cross-relaxation process to be achieved with close to 100% effectiveness.

The host crystal material can be selected from the abovelisted broad group of crystals (YAG, YSAG, YSGG, YGG, GGG, GSAG, GSGG, LLGG, YAlO, and YLF) and be doped with an amount of $Tm^{3+}$ ions between about 0.25% and about 80%. The host crystal material is preferably selected from the preferred group of YAG, YSAG, YSGG, GSAG and GSGG crystals and is doped with a preferred amount of $Tm^{3+}$ ions between about 5% and about 20%. The host crystal material is most preferably selected from the group of YAG and YSGG crystals and is doped with a most preferred amount of $Tm^{3+}$ ions between about 9% and about 15%.

It should be noted at this time that the concentration of the $Tm^{3+}$ dopant in the host crystal material of the laser crystal 15 is inversely proportional to the length of the laser crystal 15. For example, if the crystal length were 0.25 mm, a high concentration of $Tm^{3+}$ dopant (between about 50% and about 80%) would be used; if the crystal length were 25 mm, a low concentration of $Tm^{3+}$ dopant (about 0.5%) would be used; and for an intermediate crystal length between 0.25 mm and 25 mm, an intermediate concentration of $Tm^{3+}$ dopant would be used. For the exemplary crystal length of 3 mm, an exemplary 12% concentration of $Tm^{3+}$ dopant could be used.

It should be further noted at this time that, by the use of the percentage (%) ranges used in conjunction with the term "amount of $Tm^{3+}$ ions", it is meant the percent of substitution of the $Tm^{3+}$ ions for the yttrium ions in YAG, for the yttrium ions in YSAG, for the yttrium ions in YSGG, for the yttrium ions in YGG, for the gadolinium ions in GGG, for the gadolinium ions in GSAG, for the gadolinium ions in GSGG, for the lanthanum ions in LLGG, for the yttrium ions in YAlO or for the yttrium ions in YLF. For example, an amount of $Tm^{3+}$ ions of 12% in a YAG host crystal material means that the $Tm^{3+}$ ions are substituted for (or replace) 12% of the yttrium ions in the YAG crystal.

It also should be noted that the selected host crystal material is doped with the effective amount of $Tm^{3+}$ ions by applying techniques well known to those skilled in the art and, hence, requires no further description of such techniques.

Figure 3:
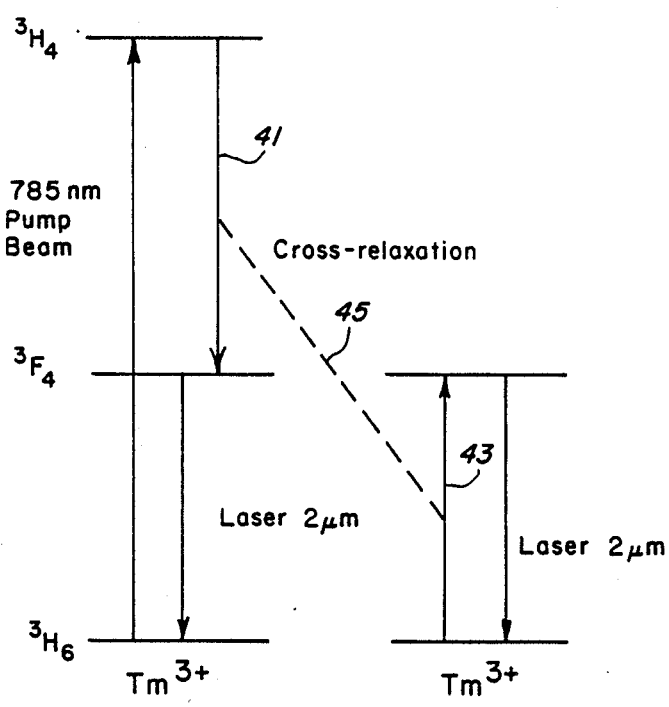
FIG. 3 illustrates the pumping diagram for an exemplary 12% amount of $Tm^{3+}$ activator ions in an exemplary YAG host material.

FIG. 3 illustrates the pumping diagram for an exemplary 12% concentration or amount of $Tm^{3+}$ activator ions (or an ion density of $1.67 \times 10^{21}$ cm$^{-3}$) in an exemplary YAG host material in the laser crystal or rod 15 of FIG. 1. More specifically, FIG. 3 shows some of the various energy levels for the $Tm^{3+}$ ions in the laser crystal 15. As shown, $^3H_4$ is the pump level for the CW 785 nm laser beam from the pump laser 13, $^3F_4$ is the upper laser level or state of the Tm-doped laser crystal 15 and $^3H_6$ is the lower laser level or state of the laser crystal 15.

In operation, the $^3H_4$ level of $Tm^{3+}$ is pumped far above the laser threshold by the CW pump beam from the pump laser 13 (FIG. 1) at 785 nm, as shown in FIG. 3. This pumping far above the laser threshold allows the lasing of virtually all of the Stark components between the upper and lower laser levels of $Tm^{3+}$. The overlap of these laser transitions due to the width of the laser emissions produces a continuous tuning spectral range from about 1.86 microns to about 2.14 microns in the exemplary 12% $Tm^{3+}$:YAG laser crystal 15 when it is pumped by the CW 785 nm laser emission from the pump laser 13. The $^3F_4$ upper laser level (of the $Tm^{3+}$-doped laser crystal 15) is populated by a cross-relaxation process (indicated by arrows 41 and 43 connected by a dashed line 45) in which two $Tm^{3+}$ ions, one in the $^3H_4$ pump level and one in the $^3H_6$ ground state, exchange energy. This energy exchange results in two $Tm^{3+}$ ions moving to the $^3F_4$ level. Lasing or photon emission from the laser crystal 15 then occurs at a wavelength around 2 microns as the excited $Tm^{3+}$ ions in the $^3F_4$ upper laser level decay to the $^3H_6$ lower laser level.

The above-described cross-relaxation process is a near-resonant nonradiative process in which an excited $Tm^{3+}$ ion in the $^3H_4$ state decays to the $^3F_4$ state and a neighboring ground-state $Tm^{3+}$ ion is promoted to the $^3F_4$ level, accompanied by the emission of photons. The obvious advantage of this cross-relaxation process or operation is that a single $Tm^{3+}$ ion excited to the $^3H_4$ level generates two $Tm^{3+}$ ions in the $^3F_4$ upper laser level. Experiments have shown that the probability of the $Tm^{3+}$ crossrelaxation occurring is small for concentrations of $Tm^{3+}$ ions less than about 2%, but approaches unity for concentrations of $Tm^{3+}$ ions greater than about 5%.

The effectiveness of the above-described cross relaxation process increases as the $Tm^{3+}$ concentration is increased, up to at least a 50% concentration. The doping of the exemplary YAG host material in the laser crystal 15 with the exemplary 12% concentration or amount of $Tm^{3+}$ ensures dominance of the cross-relaxation process over fluorescence from the $^3H_4$ pump level. The effectiveness of the cross-relaxation pumping process produces a 56% slope efficiency for CW operation of the transition from the upper laser level of $^3F_4$ to the lower laser level of $^3H_6$. This 56% slope efficiency is greater than the theoretical limit of 39% in the absence of the cross-relaxation process.

The tuning range for laser emission on the $^3F_4$ to $^3H_6$ transition of the $Tm^{3+}$ dopant in the solid state laser 11 (FIG. 1) is determined by the spectrum of fluorescence from the $^3F_4$ to the $^3H_6$ level, subject to limitations imposed by absorption from the $^3H_6$ level, which is both the ground state and the lower laser level. Room temperature fluorescence and absorption spectrums and a CW tuning curve for the $Tm^{3+}$:YAG laser crystal 15 will be discussed by now referring to FIGS. 4, 5 and 6, respectively.

Figure 4:
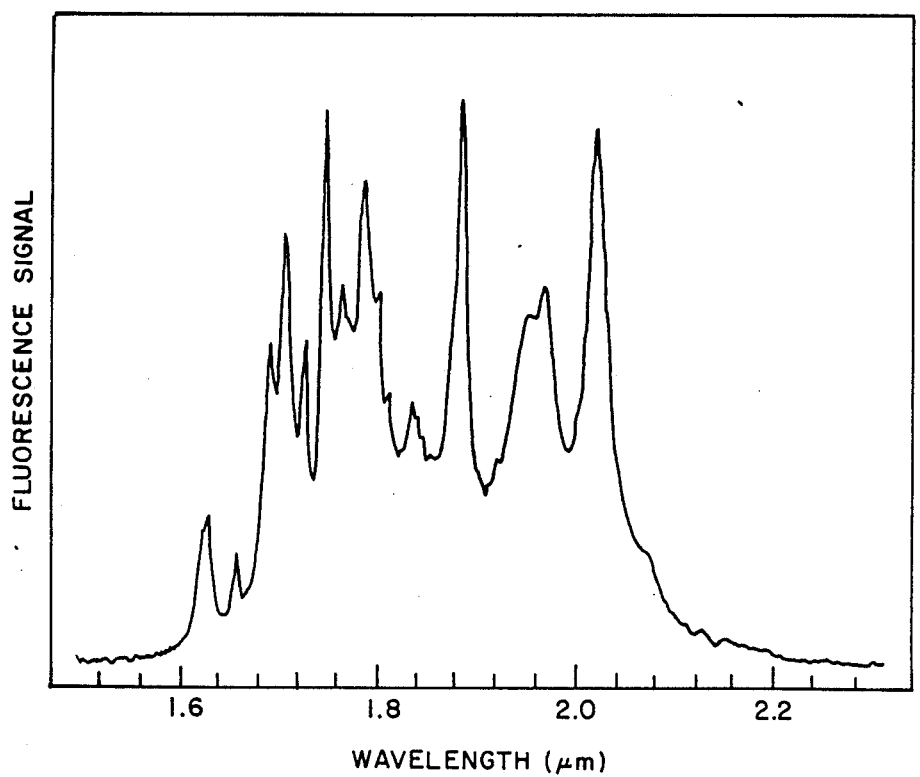
FIG. 4 illustrates the room-temperature fluorescence (emission) spectrum from the $Tm^{3+}$ $^3F_4$ level in a YAG host material.

FIG. 4 illustrates the room-temperature fluorescence (emission) spectrum from the $Tm^{3+}$ $^3F_4$ level in a YAG host material in the laser crystal 15 of FIG. 1. As shown in FIG. 4, the spectrum is continuous from about 1.6 microns to beyond 2.1 microns. Below 1.8 microns several fairly sharp peaks are evident, but the spectrum is relatively smooth above 1.8 microns.

Figure 5:
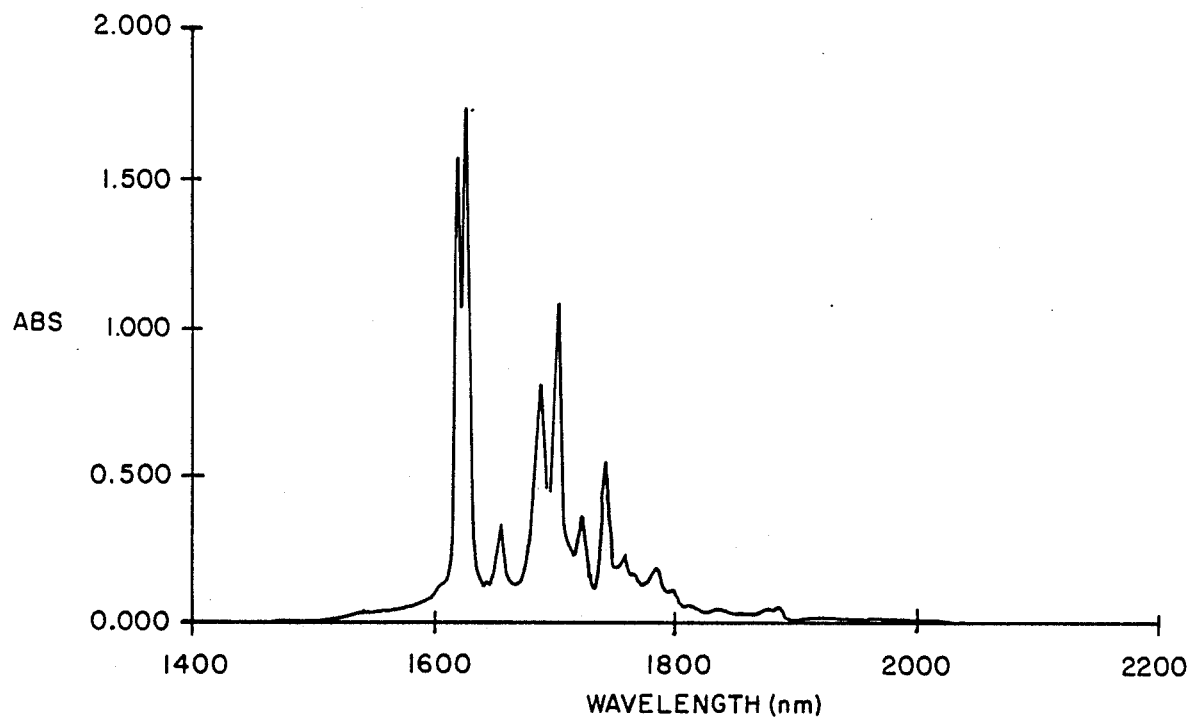
FIG. 5 illustrates the room-temperature absorption spectrum from the $Tm^{3+}$ $^3H_6$ level in a YAG host material.

FIG. 5 illustrates the room temperature spectrum of absorption into the $Tm^{3+}$ $^3F_4$ level in the YAG host material of laser crystal 15. The strong absorption between 1.6 and 1.8 microns precludes laser emission in this spectral region.

The broad overlap between the fluorescence spectrum in FIG. 4 and the absorption spectrum in FIG. 5 is due to the fact that the lower laser level ($^3H_6$) is the ground state.

Figure 6:
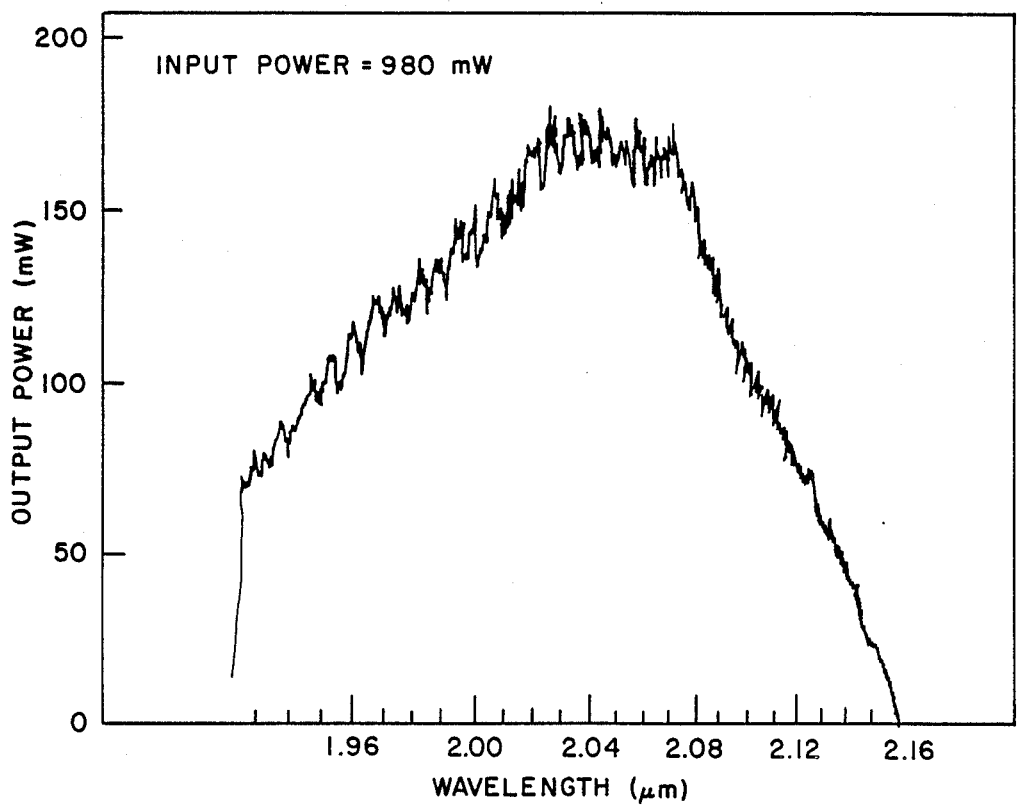
FIG. 6 illustrates the room-temperature CW tuning curve for $Tm^{3+}$:YAG.

FIG. 6 illustrates the room-temperature CW tuning curve for $Tm^{3+}$:YAG. This tuning curve is obtained by using the power meter 38 (FIG. 2) to monitor the output power of the $Tm^{3+}$-doped solid state laser 11 (FIG. 1), while the birefringent filter plate 29 (FIG. 1) is slowly being rotated about its axis by the motor 33 (FIG. 1). Note that the tuning curve of FIG. 6 is basically that portion of the fluorescence spectrum of FIG. 4 that is left after the absorption spectrum of FIG. 5 is essentially removed from the fluorescence spectrum of FIG. 4.

The incident power from the pump laser 13 is about 980 mW for the tuning curve of FIG. 6. The overall tuning range for $Tm^{3+}$:YAG is from about 1.86 to about 2.14 microns. A similar overall tuning range can be obtained by substituting any of the other previously-identified host materials for the YAG host material being discussed.

Therefore, what has been described in a preferred embodiment of the invention is a room-temperature, $Tm^{3+}$-doped, solid state laser which is pumped by a 785 nanometer, continuous wave laser beam from a pump laser to produce a continuous wave laser emission which is tunable over the spectral region from about 1.86 to about 2.14 microns.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A room-temperature solid state laser comprising:
    means for emitting a CW pump beam at a preselected wavelength;
    a laser cavity defined by first and second reflective elements opposing each other on a common axis to form a reflective path therebetween;
    a laser crystal disposed in said laser cavity, said laser crystal having a host material doped with an amount of thulium activator ions sufficient to produce a CW laser emission in the range of a plurality of wavelengths determined by Stark components in the $^3F_4$ to $^3H_6$ laser transition in said thulium activator ions when said laser crystal is pumped by said CW pump beam; and
    means disposed in said laser cavity between said laser crystal and said second reflective element for tuning the CW laser emission to any of said plurality of wavelengths within the range between approximately 1.86 microns and approximately 2.14 microns.

2. The laser of claim 1 wherein said tuning means includes:
    a tuning element; and
    means for rotating said tuning element about its axis to tune the CW laser emission to a different wavelength within said plurality of wavelengths.

3. The laser of claim 2 further including:
    a monochromator for monitoring the wavelength of the CW laser emission from said second reflective element as the CW laser emission is being tuned.

4. The laser of claim 1 further including:
    optical means disposed between said emitting means and said laser crystal for matching the CW pump beam to said laser crystal.

5. The laser of claim 1 wherein:
    said host material is selected from the group consisting of YAG, YSAG, YSGG, YGG, GGG, GSAG, GSGG, LLGG, YAlO, YLF and mixtures thereof; and
    said host material is doped with an amount of $Tm^{3+}$ activator ions between 0.25% and 80%.

6. The laser of claim 1 wherein:
    said host material is selected from the group consisting of YAG, YSAG, YSGG, GSAG, GSGG and mixtures thereof; and
    said host material is doped with an amount of $Tm^{3+}$ activator ions between 5% and 20%.

7. The laser of claim 1 wherein:
    said host material is selected from the group consisting of YAG, YSAG, YSGG, GSAG, GSGG and mixtures thereof; and
    said host material is doped with an amount of $Tm^{3+}$ activator ions between 9% and 15%.

8. The laser of claim 1 wherein:
    said host material is selected from the group consisting of YAG, YSGG and mixtures thereof; and
    said host material is doped with an amount of $Tm^{3+}$ ions of substantially 12%.

9. The laser of claim 8 wherein said tuning means includes:
    a tuning element; and
    means for rotating said tuning element about its axis to tune the CW laser emission to a different wavelength within said plurality of wavelengths.

10. The laser of claim 9 wherein:
    said tuning element is selected from the group consisting of a birefringent plate having substantially flat and substantially parallel first and second surfaces, a prism and a grating.

11. The laser of claim 9 wherein:
    said tuning element is a birefringent plate having substantially flat and substantially parallel first and second surfaces.

12. The laser of claim 11 wherein:
    said birefringent plate is a quartz birefringent filter plate disposed in said laser cavity at the Brewster angle substantially between the normal to said first surface of said quartz birefringent filter plate and the path of said CW laser emission from said laser crystal.

13. The laser of claim 9 further including:
    a monochromator for monitoring the wavelength of the CW laser emission from said second reflective element as the CW laser emission is being tuned.

14. The laser of claim 1 wherein:
    said emitting means is comprised of a titanium-sapphire laser for emitting the CW pump beam at a wavelength of approximately 0.785 microns.

15. The laser of claim 1 wherein:
    said emitting means is comprised of a laser diode source for emitting the CW pump beam at a wavelength of approximately 0.785 microns.

16. The laser of claim 15 wherein said tuning means includes:
    a tuning element; and
    means for rotating said tuning element about its axis to tune the CW laser emission to a different wavelength within said plurality of wavelengths.

17. The laser of claim 1 wherein:
    said first reflective element comprises a dichroic coating on the input surface of said laser crystal, said dichroic coating having a high transmissivity at the pump wavelength of said exciting means and a high reflectivity at approximately 2 microns; and
    said second reflective element is an output coupler having a low transmissivity at approximately 2 microns to pass CW laser emissions within said range between approximately 1.86 and 2.14 microns.

18. The laser of claim 17 wherein said tuning means includes:
    a tuning element; and
    means for rotating said tuning element about its axis to tune the CW laser emission to a different wavelength within said plurality of wavelengths.

19. The laser of claim 18 further including:
    a monochromator for monitoring the wavelength of the CW laser emission from said output coupler as the CW laser emission is being tuned.

20. The laser of claim 19 further including:
    optical means disposed between said emitting means and said laser crystal for matching the CW pump beam to said laser crystal.

21. The laser of claim 20 wherein:

said host material is selected from the group consisting of YAG, YSAG, YSGG, GSAG, GSGG and mixtures thereof; and said host material is doped with an amount of $Tm^{3+}$ activator ions between 5% and 20%.

22. The laser of claim 18 wherein:

said emitting means is selected from the group consisting of a titanium-sapphire laser and a laser diode source to emit the CW pump beam at a wavelength of approximately 0.785 microns.

23. A method for producing a CW laser emission at any of a plurality of wavelengths within the range between approximately 1.86 microns and approximately 2.14 microns, said method comprising the steps of:

forming a laser crystal having a host material doped with a concentration of $Tm^{3+}$ activator ions sufficient to produce a laser emission on the $^3F_4$ to $^3H_6$ transition of the $Tm^{3+}$ activator ions when the laser crystal is pumped by a CW pump beam at a preselected wavelength;

generating a CW pump beam at the preselected wavelength;

directing the CW pump beam into $Tm^{3+}$- doped host material of the laser crystal to produce a CW laser emission in the approximate 1.86 to 2.14 micron range of the $^3F_4$ to $^3H_6$ transition of the $Tm^{3+}$ activator ions; and tuning the CW laser emission to a wavelength within the range between approximately 1.86 microns and approximately 2.14 microns.

* * * * *